(12) United States Patent
Nakao

(10) Patent No.: US 9,560,222 B2
(45) Date of Patent: Jan. 31, 2017

(54) DOCUMENT READING DEVICE AND IMAGE FORMING APPARATUS

(71) Applicant: KYOCERA Document Solutions Inc., Osaka (JP)

(72) Inventor: Mitsutoshi Nakao, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/721,737

(22) Filed: May 26, 2015

(65) Prior Publication Data
US 2015/0350476 A1 Dec. 3, 2015

(30) Foreign Application Priority Data
May 29, 2014 (JP) .................................. 2014-111055

(51) Int. Cl.
*H04N 1/46* (2006.01)
*H04N 1/00* (2006.01)
*G06K 9/00* (2006.01)

(52) U.S. Cl.
CPC ...... *H04N 1/00336* (2013.01); *G06K 9/00456* (2013.01); *H04N 2201/3243* (2013.01); *H04N 2201/3245* (2013.01)

(58) Field of Classification Search
None
See application file for complete search history.

(56) References Cited

U.S. PATENT DOCUMENTS

| 6,593,908 | B1 * | 7/2003 | Borgstrom | B41J 2/315 178/18.01 |
| 7,698,644 | B2 * | 4/2010 | Hawk | G06F 3/0483 370/352 |
| 8,417,581 | B2 * | 4/2013 | Ajjarapu | G06Q 30/06 434/107 |
| 9,270,852 | B2 * | 2/2016 | Harada | H04N 1/00328 |
| 2002/0078035 | A1 * | 6/2002 | Frank | G06F 17/30241 |
| 2003/0103071 | A1 * | 6/2003 | Lusen | G06F 17/241 715/705 |
| 2005/0091027 | A1 * | 4/2005 | Zaher | G06F 17/241 703/22 |
| 2005/0091578 | A1 * | 4/2005 | Madan | G06F 17/241 715/201 |

(Continued)

FOREIGN PATENT DOCUMENTS

JP 2000-222394 A 8/2000

*Primary Examiner* — Madelein Nguyen
(74) *Attorney, Agent, or Firm* — IP Business Solutions, LLC

(57) ABSTRACT

A document reading device includes a document reading section, a sticky note image detecting section, a first determining section, a detection target image storage section, a consistent image detecting section, a second determining section, and a control section. When the first determining section determines that the position of a sticky note image in a document image of an original document is at a location in the document where a content is described and the second determining section determines that an image consistent with the sticky note image is located at a signature space in a second document image of the original document read by a different reading, the control section permits formation or saving of the second document image acquired by the different reading.

6 Claims, 6 Drawing Sheets

(56) References Cited

U.S. PATENT DOCUMENTS

| | | | |
|---|---|---|---|
| 2006/0218501 A1* | 9/2006 | Wilson | G06F 3/0486 715/769 |
| 2006/0265640 A1* | 11/2006 | Albornoz | G06F 17/2247 715/234 |
| 2007/0161382 A1* | 7/2007 | Melinger | H04L 67/18 455/456.1 |
| 2008/0136833 A1* | 6/2008 | Taniguchi | G09G 5/24 345/581 |
| 2008/0222552 A1* | 9/2008 | Batarseh | G06F 3/0483 715/776 |
| 2008/0225319 A1* | 9/2008 | Takada | B41J 3/407 358/1.12 |
| 2008/0270879 A1* | 10/2008 | Komatsu | G06K 9/2063 715/200 |
| 2009/0049384 A1* | 2/2009 | Yau | G06F 3/04817 715/716 |
| 2010/0017223 A1* | 1/2010 | Johnson | G06Q 50/22 705/2 |
| 2010/0075697 A1* | 3/2010 | Gupta | H04W 4/02 455/456.3 |
| 2010/0313114 A1* | 12/2010 | Colbran | G06F 17/241 715/230 |
| 2011/0029855 A1* | 2/2011 | Morita | G06F 3/03545 715/233 |
| 2011/0066619 A1* | 3/2011 | Perantatos | G06F 17/30011 707/739 |
| 2011/0072382 A1* | 3/2011 | Caldwell | G05B 23/0216 715/772 |
| 2011/0115825 A1* | 5/2011 | Tetsuhashi | G06F 3/0483 345/672 |
| 2012/0263381 A1* | 10/2012 | Yoshida | G06F 3/03545 382/189 |
| 2012/0299825 A1* | 11/2012 | Takahashi | G06F 1/1624 345/156 |
| 2013/0083176 A1* | 4/2013 | Kasahara | G06T 11/60 348/61 |
| 2013/0159844 A1* | 6/2013 | Tamura | G06F 17/217 715/251 |
| 2013/0255846 A1* | 10/2013 | Pratt | A45C 11/18 150/147 |
| 2014/0036169 A1* | 2/2014 | Yoshida | G06F 3/0321 349/12 |
| 2014/0139874 A1* | 5/2014 | Miyai | H04N 1/32101 358/1.15 |
| 2014/0164852 A1* | 6/2014 | Sumiyoshi | H04N 7/155 714/57 |
| 2015/0121191 A1* | 4/2015 | Nakamori | G06F 17/241 715/230 |
| 2015/0146266 A1* | 5/2015 | Nakao | H04N 1/3872 358/452 |

* cited by examiner

Fig.4

...
【ARTICLES】
C1 → ・・・SHALL BE AAA.・・・
・・・・・・
・・SHALL BE BBB.・・・・

* * * * * * * * * * * * * * * * * * * *
* * * * * * * * * * * * * * * * * * * *
* * * * * * * * * * * * * * * * * * * *
* * * * * * * * * * * * * * * * * * * *
* * * * * * * * * * * * * * * * * * * *
* * * * * * * * * * * * * * * * * * * *
* * * * * * * * * * * * * * * * * * * *
* * * * * * * * * * * * * * * * * * * *
* * * * * * * * * * * * * * * * * * * *
* * * * * * * * * * * * * * * * * * * *
* * * * * * * * * * * * * * * * * * * *
* * * * * * * * * * * * * * * * * * * *
* * * * * * * * * * * * * * * * * * * *
* * * * * * * * * * * * * * * * * * * *
* * * * * * * * * * * * * * * * * * * *
* * * * * * * * * * * * * * * * * * * *
* * * * * * * * * * * * * * * * * * * *   ~300

CONFIRMATION SECTION
C2 → AAA  I HAVE CONFIRMED * * *. _____ L.S. ← C21
BBB  I HAVE CONFIRMED * * *. _____ L.S. ← C22
・・・・

DOCUMENT READING DEVICE AND IMAGE FORMING APPARATUS

INCORPORATION BY REFERENCE

This application claims priority to Japanese Patent Application No. 2014-111055 filed on May 29, 2014, the entire contents of which are incorporated by reference herein.

BACKGROUND

The present invention relates to a document reading device for use to digitize an original paper document and an image forming apparatus with the same.

Sticky notes, which are small paper slips capable of being attached on any place, are widely used in offices, homes, and other locations. Particularly owing to their capability of multiple detachment and reattachment, sticky notes are often used as notes of comments or the like in a manner that they are put on paper documents or the like.

In techniques for optically reading a document (original document) with a sticky note put thereon, it may be desirable in some cases, not to digitize the entire original document as it is, but to handle the sticky note given additional information and the body of the original document separately from each other. For example, a technique is disclosed in which in digitizing an original document with a sticky note put thereon, information given to the sticky note is digitized separately from the body and shared among a plurality of persons.

SUMMARY

A technique improved over the above techniques is proposed herein as one aspect of the present disclosure.

A document reading device according to an aspect of the present disclosure includes a document reading section, a sticky note image detecting section, a first determining section, a detection target image storage section, a consistent image detecting section, a second determining section, and a control section.

The document reading section is configured to optically read a document image of an original document.

The sticky note image detecting section is configured to detect, from the document image read by the document reading section, a sticky note image consistent with a predetermined standard sticky note image representing a sticky note and a position of the sticky note image in the document image.

The first determining section is configured to determine whether or not the position of the sticky note image detected by the sticky note image detecting section is a predetermined first position in the document image.

The detection target image storage section is configured to, when the first determining section determines that the position of the sticky note image is the first position, store the sticky note image as a detection target image.

The consistent image detecting section is configured to detect, from a second document image acquired by a different reading of the original document by the document reading section, a consistent image having a predetermined consistency with the detection target image stored in the detection target image storage section.

The second determining section is configured to determine whether or not a position of the detected consistent image is a predetermined second position different from the first position in the document image.

The control section is configured to, when the second determining section determines that the position of the consistent image is the second position, permit formation or saving of the second document image acquired by the different reading.

An image forming apparatus according to another aspect of the present disclosure is an image forming apparatus including a document reading device and an image forming section, the image forming section being configured to form on a sheet a document image of an original document acquired by reading by the document reading device, the document reading device including:

a document reading section configured to optically read a document image of the original document;

a sticky note image detecting section configured to detect, from the document image read by the document reading section, a sticky note image consistent with a predetermined standard sticky note image representing a sticky note and a position of the sticky note image in the document image;

a first determining section configured to determine whether or not the position of the sticky note image detected by the sticky note image detecting section is a predetermined first position in the document image;

a detection target image storage section configured to, when the first determining section determines that the position of the sticky note image is the first position, store the sticky note image as a detection target image;

a consistent image detecting section configured to detect, from a second document image acquired by a different reading of the original document by the document reading section, a consistent image having a predetermined consistency with the detection target image stored in the detection target image storage section;

a second determining section configured to determine whether or not a position of the detected consistent image is a predetermined second position different from the first position in the document image; and a control section configured to, when the second determining section determines that the position of the consistent image is the second position, permit formation or saving of the second document image acquired by the different reading, wherein the control section is further configured to, when the second determining section determines that the position of the detection target image is the second position, cause the image forming section to form the second document image acquired by the different reading.

BRIEF DESCRIPTION OF THE DRAWINGS

FIG. 4 is a view showing an example of an original document of confirmation.

DETAILED DESCRIPTION

Figure 1:
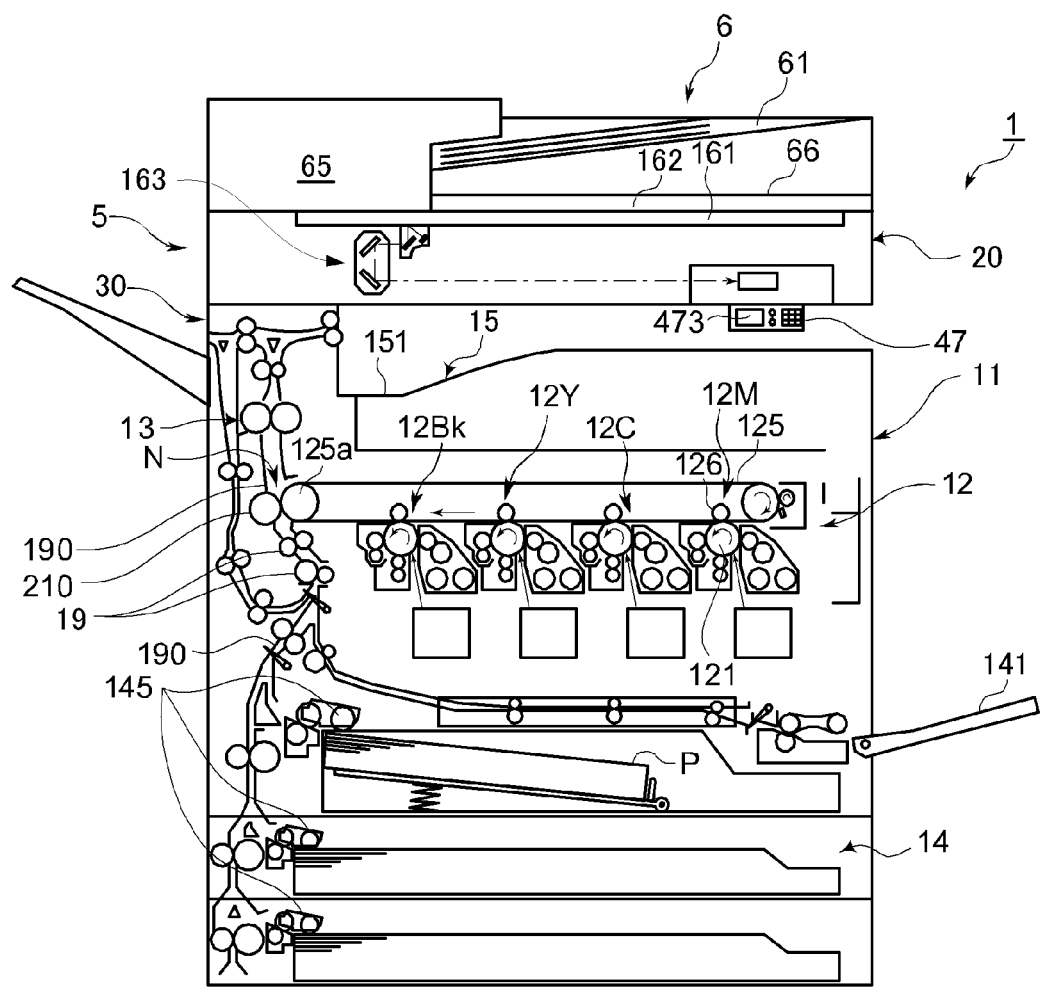
FIG. 1 is a front cross-sectional view showing the structure of an image forming apparatus according to one embodiment of the present disclosure.

Hereinafter, a description will be given of an image forming apparatus according to one embodiment of the present disclosure with reference to the drawings. FIG. 1 is a front cross-sectional view showing the structure of the image forming apparatus according to the one embodiment of the present disclosure. The image forming apparatus 1 is a multifunction peripheral having multiple functions including, for example, a copy function, a print function, a scan function, and a facsimile function.

The image forming apparatus 1 is roughly composed of an apparatus body 11, a document reading device 20 opposed to and above the apparatus body 11, and a connecting portion 30 provided between the document reading device 20 and the apparatus body 11.

The document reading device 20 is supported at the top end of the connecting portion 30.

The document reading section 5 includes an original glass plate 161 which is fitted to the top of an opening in a housing of the document reading section 5 and on which an original document is to be placed. The original glass plate 161 includes: a fixed document reading portion (not shown) for use in reading an original document placed thereon; and a conveyed document reading portion (not shown) for use in reading an original document being conveyed by a document feed section 6. The document reading section 5 further includes: an openable/closable original cover 162 capable of holding the original document placed on the fixed document reading portion of the original glass plate 161; and a scanning mechanism 163 for reading an image of the original document placed on the fixed document reading portion of the original glass plate 161 and an image of the original document being conveyed across the conveyed document reading portion of the original glass plate 161. The scanning mechanism 163 optically reads the image of the original document using an image sensor, such as a CCD (charge coupled device) or a CMOS (complementary metal oxide semiconductor), to generate image data.

The document feed section 6 includes a document loading chute 61 on which to-be-read original documents are to be placed, a document ejection portion 66 to which already read original documents are to be ejected, and a document conveyance mechanism 65. The document conveyance mechanism 65 includes an unshown sheet feed roller, an unshown conveyance roller, and an unshown sheet reversing mechanism. The document conveyance mechanism 65 is configured to feed the original documents placed on the document loading chute 61 sheet by sheet by the drive of the sheet feed roller, convey the document to the conveyed document reading portion of the original glass plate 161 by the drive of the conveyance roller to allow the scanning mechanism 163 to scan the document, and then eject it to the document ejection portion 66. Furthermore, the document conveyance mechanism 65 allows the sheet reversing mechanism to reverse the side of the original document and conveys the document to the conveyed document reading portion of the original glass plate 161 again to allow the scanning mechanism 163 to scan not only one side of the document but also the other side thereof.

Moreover, the document feed section 6 is pivotally mounted to the document reading section 5 so that its front side can move upward. When the front side of the document feed section 6 is moved up to make the top surface of the original glass plate 161 as a document table open, the user can place, on the top surface of the original glass plate 161, a to-be-read original document, for example, an open book with facing pages.

An operating section 47 is disposed at the front of the document reading device 20. The operating section 47 is configured to receive user s commands for various types of operations and processing executable by the image forming apparatus 1, such as a command to execute an image forming operation and a command to execute a document reading operation. The operating section 47 includes a display 473 configured to display operation guidance and so on for the user.

The apparatus body 11 is made up to include an image forming section 12, a fixing section 13, a sheet feed section 14, a sheet output section 15, and so on.

In a document reading operation of the image forming apparatus 1, the document reading section 5 optically reads an image of an original document being conveyed by the document feed section 6 or an image of an original document placed on the original glass plate 161 to generate image data. The image data generated by the document reading section 5 is stored on an internal HDD, a network-connected computer or the like.

In an image forming operation of the image forming apparatus 1, the image forming section 12 forms a toner image on a paper sheet P serving as a recording medium fed from the sheet feed section 14, based on image data generated by the document reading operation, image data received from a network-connected computer or a user terminal, such as a smartphone, or image data stored on the internal HDD. Each of image forming units 12M, 12C, 12Y, and 12Bk of the image forming section 12 includes a photosensitive drum 121, a developing device operable to supply toner to the photosensitive drum 121, a toner cartridge for holding toner, a charging device, an exposure device, and a primary transfer roller 126.

In the case of color printing, the image forming unit 12M for magenta, the image forming unit 12C for cyan, the image forming unit 12Y for yellow, and the image forming unit 12Bk for black of the image forming section 12 form respective toner images on their respective photosensitive drums 121 through charging, exposure, and developing processes based on respective images of respective different color components constituting the above image data and then allow their respective primary transfer rollers 126 to transfer the toner images to an intermediate transfer belt 125.

The toner images of different colors transferred to the intermediate transfer belt 125 are superposed each other on the intermediate transfer belt 125 by controlling their transfer timings, resulting in a multicolor toner image. A secondary transfer roller 210 transfers the multicolor toner image formed on the surface of the intermediate transfer belt 125, at a nip N between the secondary transfer roller 210 and the drive roller 125a with the intermediate transfer belt 125 in between, to a paper sheet P conveyed from the sheet feed section 14 along a conveyance path 190 by a conveyance roller pair 19. Thereafter, the fixing section 13 fixes the toner image on the paper sheet P by the application of heat and pressure. The paper sheet P having a multicolor image fixed thereon by the completion of the fixation treatment is discharged to a sheet output tray 151.

The sheet feed section 14 includes a plurality of sheet feed cassettes including a manual feed tray 141. A control section 100 (see FIG. 2) rotationally drives a pick-up roller 145 of the sheet feed cassette containing paper sheets of the size designated by an user's command and thereby allows the pick-up roller 145 to feed a paper sheet P contained in the sheet feed cassette toward the nip N.

Figure 2:
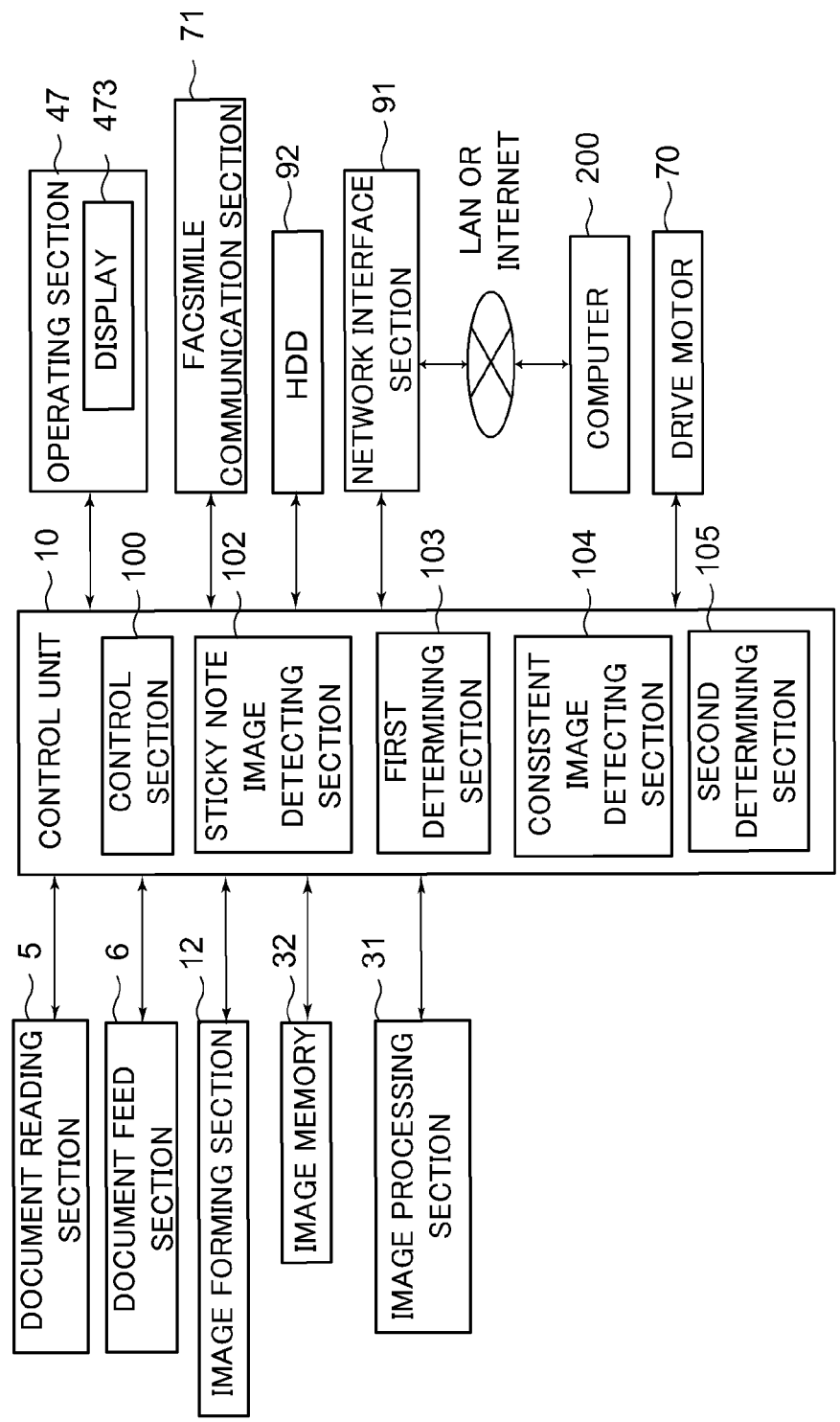
FIG. 2 is a functional block diagram showing an essential internal configuration of the image forming apparatus.

Next, a description will be given of the structure of the image forming apparatus 1. FIG. 2 is a functional block diagram showing an essential internal configuration of the image forming apparatus 1.

The image forming apparatus 1 includes a control unit 10. The control unit 10 is composed of a CPU (central processing unit), a RAM, a ROM, a dedicated hardware circuit, and so on and governs the overall operation control of the image forming apparatus 1.

The document reading section 5 is under the control of the control unit 10 and includes the aforementioned scanning mechanism 163 including a lighting part, a CCD sensor, and so on. The document reading section 5 is configured to read a document image from an original document by irradiating the document with light from the lighting part and receiving the reflected light on the CCD sensor.

An image memory 32 provides a region for temporarily storing data of the document image acquired by reading by the document reading section 5 and temporarily saving data to be printed by the image forming section 12.

An image processing section 31 is configured to retrieve from the image memory 32 the image read by the document reading section 5 and process the image. For example, in order that the image read by the document reading section 5 will be improved in quality after the formation of an image in the image forming section 12, the image processing section 31 performs predetermined image processing, such as shading correction.

The image forming section 12 is configured to form an image of print data read by the document reading section 5, an image of print data received from the network-connected computer 200, or the like.

The operating section 47 is configured to receive user's commands for various types of operations and processing executable by the image forming apparatus 1. The operating section 47 includes a touch panel display 473 formed of a liquid crystal display.

The display 473 is configured to, while the image forming apparatus 1 is in a normal operation mode, display images of various screens, such as an operating screen, a preview screen, and a screen for checking the status of a print job. On the other hand, while the image forming apparatus 1 is in a sleep mode, the display 473 is turned off.

A facsimile communication section 71 includes a coding/decoding section, a modulation/demodulation section, and an NCU (network control unit), all of which are not illustrated, and performs facsimile communication using a public telephone network.

A network interface section 91 is constituted by a communication module, such as a LAN board, and transfers various data to and from computers 200 and the like in a local area via a LAN or the like connected to the network interface section 91.

An HDD (hard disk drive) 92 is a large storage device capable of storing the document image read by the document reading section 5 or like image. The HDD 92 is an example of a storage section in this embodiment.

A drive motor 70 is a drive source for applying a rotary drive force to various rotary members of the image forming section 12, the conveyance roller pair 19, and other rotary members.

The control unit 10 is composed of a CPU, a ROM, a RAM, and so on and governs the overall operation control of the image forming apparatus 1. The control unit 10 includes the control section 100, a sticky note image detecting section 102, a first determining section 103, a consistent image detecting section 104, and a second determining section 105. A document preparation program is stored on the HDD 92 or in the aforementioned ROM. The control unit 10 operates according to the document preparation program to serve as the control section 100, the sticky note image detecting section 102, the first determining section 103, the consistent image detecting section 104, and the second determining section 105 to perform operations necessary for the undermentioned print processing described in this embodiment. Alternatively, instead of following the document preparation program, the control unit 10 may include as hard circuits the control section 100, the sticky note image detecting section 102, the first determining section 103, the consistent image detecting section 104, and the second determining section 105.

The control section 100 governs the overall operation control of the image forming apparatus 1, is connected to the document reading section 5, the document feed section 6, the image memory 32, the image processing section 31, the image forming section 12, the operating section 47, the facsimile communication section 71, the network interface section 91, the HDD 92, and so on, and controls the operations of these components.

The sticky note image detecting section 102 is configured to detect, from the document image read by the document reading section 5, a sticky note image consistent with a predetermined standard sticky note image representing a sticky note and the position of the sticky note image in the document image. The sticky note image detecting section 102 previously stores as the standard sticky note image, for example, any one of an image of a blank elongated rectangular piece, an image of a blank elongated rectangular piece of specific color, and an image of an elongated rectangular piece with an affixed predetermined mark image. The mark image refers to an image for use as an identification mark for facilitating the determination of whether or not the relevant image is consistent with an image for comparison. The description in this embodiment will be given by taking, as an example, the case where the standard sticky note image is an image of an elongated rectangular piece with an affixed predetermined make image. The detection of a sticky note image consistent with the standard sticky note image is performed, for example, by pattern matching.

The number of sticky note images in one document image is not limited to one but may be two or more. Therefore, the sticky note image detecting section 102 detects each of a plurality of sticky note images contained in the document image and being consistent with the standard sticky note image and their respective positions in the document image.

The first determining section 103 is configured to determine whether or not the position of each sticky note image detected by the sticky note image detecting section 102 is a predetermined first position in the document image. For example, the first determining section 103 has an xy coordinate system representing a document image area of a standard original document size, for example, A4 size, and stores as the predetermined first position a specific region defined by xy coordinates. Alternatively, when the first determining section 103 determines that the sticky note image masks an image representing a predetermined character string in the document image, it determines that the sticky note image is located at the predetermined first position. In this case, the first position is a position where the sticky note image masks any image representing the predetermined character string.

At this time, when the first determining section 103 determines that the position of the sticky note image is the first position, the control unit 10 allows the internal memory or the HDD 92 to store the sticky note image as a detection target image. In this case, the memory or the HDD 92 serves as an example of a detection target image storage section in this embodiment. The description in this embodiment will be given by taking an example where the memory serves as the detection target image storage section.

The consistent image detecting section 104 is configured to detect, from a second document image acquired by a different reading of the original document by the document reading section 5, a consistent image at least partly consistent with the detection target image stored in the image memory, for example, using pattern matching. Therefore, the consistent image detecting section 104 detects, from the second document image acquired by the different reading, an image similar to the sticky note image which is the detection target image.

The second determining section 105 is configured to determine whether or not the position of the consistent image detected by the consistent image detecting section 104 is a predetermined second position in the document image. For example, the second determining section 105 has an xy coordinate system representing a document image area of a standard document size, for example, A4 size, and stores as the predetermined second position a specific region defined by xy coordinates and different from the first position. Furthermore, when the second determining section 105 determines that the consistent image masks a predetermined image composed of a character string, a symbol, a space or so on in the document image, it determines that the consistent image is located at the predetermined second position.

Moreover, when the second determining section 105 determines that the position of the consistent image is the second position, the control section 100 permits the second document image acquired by the different reading to be formed by the image forming section 12 or to be saved in the image memory 32 or on the HDD 92 and cause the formation or saving to be implemented.

Figure 3:
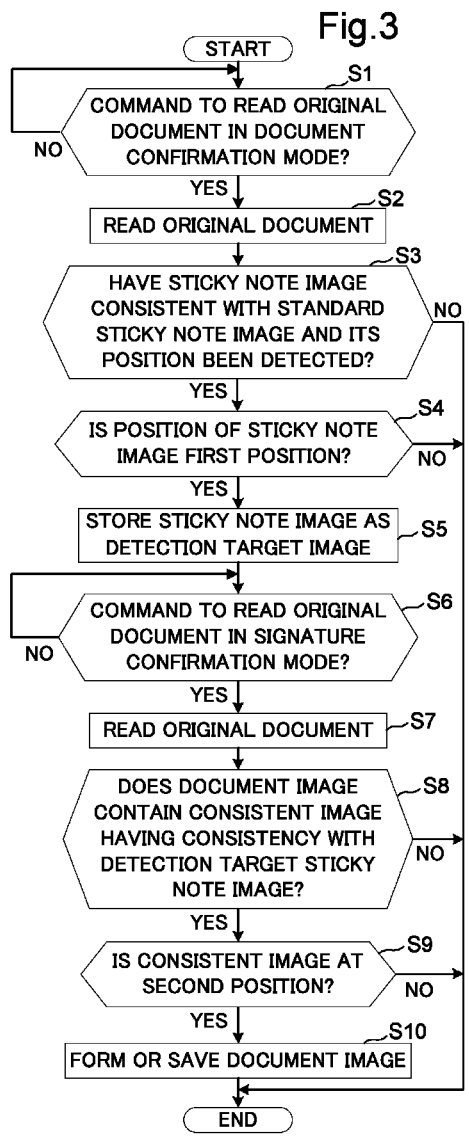
FIG. 3 is a flowchart showing document preparation processing of the image forming apparatus.
Figure 5:
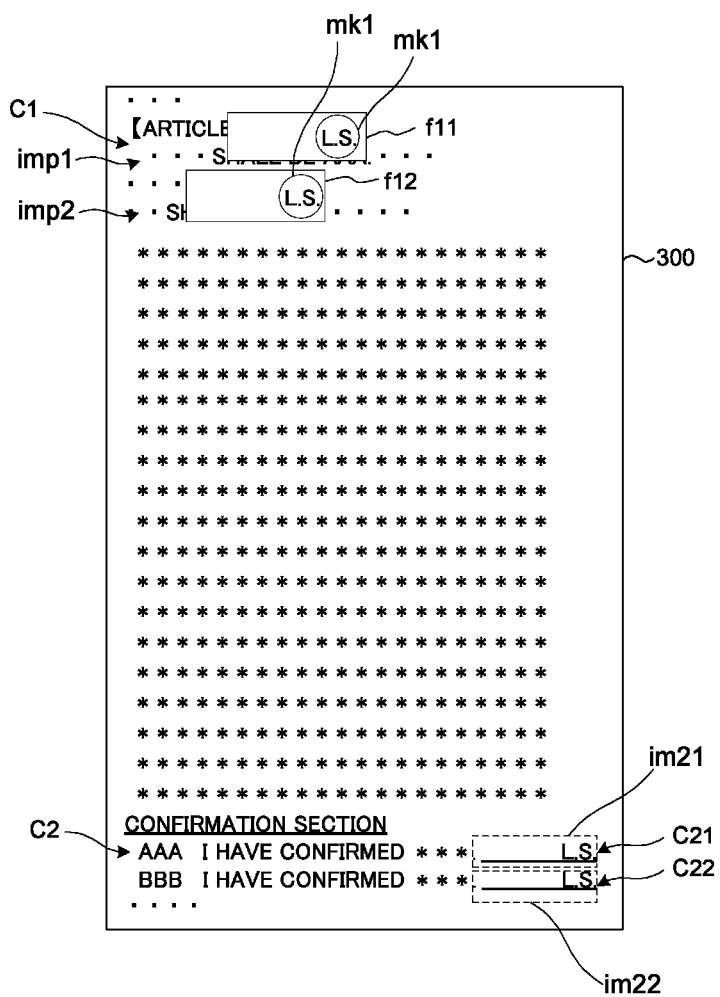
FIG. 5 is a view showing the original document of confirmation in which sticky notes are put on locations where matters to be confirmed are described.

Next, a description will be given of document preparation processing of the image forming apparatus 1. FIG. 3 is a flowchart showing the document preparation processing of the image forming apparatus 1. FIG. 4 is a view showing an example of an original document of confirmation. FIG. 5 is a view showing the original document of confirmation in which sticky notes are put on locations where matters to be confirmed are described. Note that the "agreement" below is an example of an original document in this embodiment.

First, a user prepares a paper document of confirmation shown as an example in FIG. 4, for example, an agreement 300. This agreement 300 includes contents C1 and, at the end, a confirmation section C2 for showing that a counterparty has confirmed the contents C1. This agreement 300 is a document which the counterparty is requested to sign in signature spaces C21, C22 (for example, spaces anterior to the letters "L.S.") of the confirmation section C2 with an understanding of the agreement contents C1.

The document reading device 20 according to this embodiment includes the document reading section 5, the control section 100, the sticky note image detecting section 102, the first determining section 103, the consistent image detecting section 104, and the second determining section 105.

As shown in FIG. 5, the user puts a sticky note f11 on a location imp1 in the agreement 300 where an important matter is described and puts a sticky note f12 on a location imp2 in the agreement 300 where another important matter is described. In this embodiment, the sticky notes f11, f12 are those of the same type. For example, if the contracting party wants the counterparty to take particular note of, among the contents of the agreement 300, the phrase "AAA" in the location imp1 and the phrase "BBB" in the location imp2, the sticky notes f11, f12 are attached on the agreement 300 to overlap these phrases. The number of locations in the document where sticky notes are put is not limited. The description in this embodiment will be given by taking, as an example, the case where two sticky notes f11, f12 are put on the agreement 300. Each sticky note f11, f12 has the aforementioned mark image or similar graphic mk1 (see FIG. 5). In this embodiment, an image formed of the letters "L.S." inside a circle, i.e., an image similar to a graphic mk1, is used as the mark image. The sticky note f11 used is one having a shape and a color similar to those of a standard sticky note image to be described hereinafter.

Then, the user places, on the original glass plate 161 of the image forming apparatus 1, the agreement 300 with the sticky notes f11, f12 put thereon in the above manner and enters through the operating section 47 a command to allow the document reading section 5 to read the agreement 300.

When the image forming apparatus 1 receives an entry of the command to allow the document reading section 5 to read the agreement 300 in a document confirmation mode (YES in S1), the control section 100 allows the document reading section 5 to read as an original document the agreement 300 having the sticky notes f11, f12 attached thereon (S2). The document confirmation mode refers to the mode of performing a series of steps of processing for determining whether or not a sticky note image representing a sticky note exists at a predetermined position in a document image acquired by reading an original document placed on the original glass plate 161 in the document reading section 5.

Subsequently, the sticky note image detecting section 102 of the image forming apparatus 1 detects, from the document image read by the document reading section 5 in S2, any sticky note image consistent with the predetermined standard sticky note image and the position of the sticky note image in the document image (S3). The standard sticky note image has the same shape and color as the sticky notes f11, f12.

When the sticky note image detecting section 102 has detected any sticky note image consistent with the standard sticky note image and its position (YES in S3), the first determining section 103 determines whether or not the detected position of the sticky note image is a predetermined first position in the document image (S4).

When the first determining section 103 determines that the position of the sticky note image is the first position in the document image (YES in S4), the sticky note image storage section, for example, the image memory 32, stores the sticky note image as a detection target sticky note image (S5).

For example, the first position is a position in the document image where the sticky note image masks at least one of images of predetermined character strings, which are a predetermined phrase "AAA" in the location imp1 and a predetermined phrase "BBB" in the location imp2. Therefore, when the document reading section 5 reads a document image of the agreement 300 on which, as shown in FIG. 5, the sticky note f11 is attached to mask the phrase "AAA" in the location imp1 and the sticky note f12 is attached to mask the phrase "BBB" in the location imp2, the first determining section 103 determines that in the read document image the image representing the phrase "AAA" is masked by the image representing the sticky note f11 and the image representing the phrase "BBB" is masked by the image representing the sticky note f12, and thus determines that the sticky notes are located at the first position in the document image.

After the step S5, the control section 100 stands by for an entry of a command to read the original document in a signature confirmation mode to be described hereinafter (S6). If NO in S3 or NO in S4, the processing ends without the aforementioned standby and the storage of a detection target sticky note image in S5.

By performing the above series of steps of processing with the reading of the agreement 300 by the image forming apparatus 1, it can be ensured that any sticky note has been put on a predetermined position (the first position) in the agreement 300, i.e., on a location in the agreement 300 where a matter to be particularly confirmed by the counterparty is described, and an image representing the sticky note put on the position can be acquired as data for use for image detection to be described below.

Thereafter, the user passes the paper agreement 300 to the counterparty. This agreement 300 has, as described previously, the sticky notes f11, f12 put on the phrases "AAA" and "BBB" in the locations imp1, imp2, respectively, where important matters are described. The counterparty having received the agreement 300 reads and confirms its contents. In doing so, the attachment of the sticky notes f11, f12 particularly facilitates the counterparty's confirmation of the phrases "AAA" and "BBB" in the locations imp1, imp2.

The counterparty signs his/her name on the sticky notes f11, f12 themselves. At this time, as described above, the sticky note f11 is put on the phrase "AAA" in the location imp1 in the agreement 300 where an important matter is described, and the sticky note f12 is put on the phrase "BBB" in the location imp2 in the agreement 300 where another important matter is described. In addition, the phrases "AAA" and "BBB" are masked by the sticky notes f11, f12, respectively. Therefore, in order that the counterparty confirms the phrases"AAA" and "BBB" in the locations imp1, imp2 and signs his/her name, he/she must remove the sticky notes f11, f12 from the locations imp1, imp2, move them to other locations, and then sign his/her name. Hence, in writing his/her signature, the counterparty substantially certainly confirms the phrases "AAA" and "BBB" in the locations imp1, imp2.

Thereafter, the counterparty removes the signed sticky notes f11, f12 again and reattaches the signed sticky notes f11, f12 on the signature spaces C21, C22 of the confirmation section C2 for the locations imp1, imp2, respectively. The user having prepared the agreement 300 receives the agreement 300 on which the signed sticky notes f11, f12 have been reattached in the above manner.

The user having received the agreement 300 places the agreement 300 on the original glass plate 161 of the image forming apparatus 1 and enters through the operating section 47 a command to perform a signature confirmation mode (S6). The signature confirmation mode refers to the mode of performing a series of steps of processing for determining whether or not a document image acquired by allowing the document reading section 5 to read the original document placed on the original glass plate 161 at this point in time contains the detection target sticky note image stored in S5 and for determining, based on the determination result, whether or not to form or save the acquired document image.

When the command to perform the signature confirmation mode is entered (YES in S6), the control section 100 allows the document reading section 5 to read as the original document the agreement 300 having the sticky notes f11, f12 reattached thereon (S7).

Subsequently, the consistent image detecting section 104 determines whether or not the document image of the agreement 300 acquired by the reading in S7 contains an image having a predetermined consistency with the detection target sticky note image stored in S5 (S8).

As described above, the sticky note images contained in the document image read in S7 and representing the sticky notes f11, f12 are those after being signed by the counterparty and are different from the detection target sticky note image. Therefore, if the consistency for use in S8 in determining the presence or absence of images corresponding to the signed sticky notes f11, f12 were a complete consistency, the consistent image detecting section 104 could not detect any image corresponding to the signed sticky notes f11, f12. For this reason, the complete consistency is not used as a criterion for determining the presence or absence of the images in S8. For example, the consistency used in this case is such a consistency that both images compared to each other have a commonality as images representing a sticky note but have a difference in the presence or absence of an image representing a signature.

If the consistent image detecting section 104 determines that the document image of the agreement 300 acquired by reading in S7 contains an image (hereinafter, referred to as a consistent image) having the predetermined consistency with the detection target sticky note image stored in S5 (YES in S8), the second determining section 105 determines whether or not the position of the consistent image detected by the consistent image detecting section 104 in S8 is the aforementioned second position in the document image acquired in S7 (S9).

Figure 6:
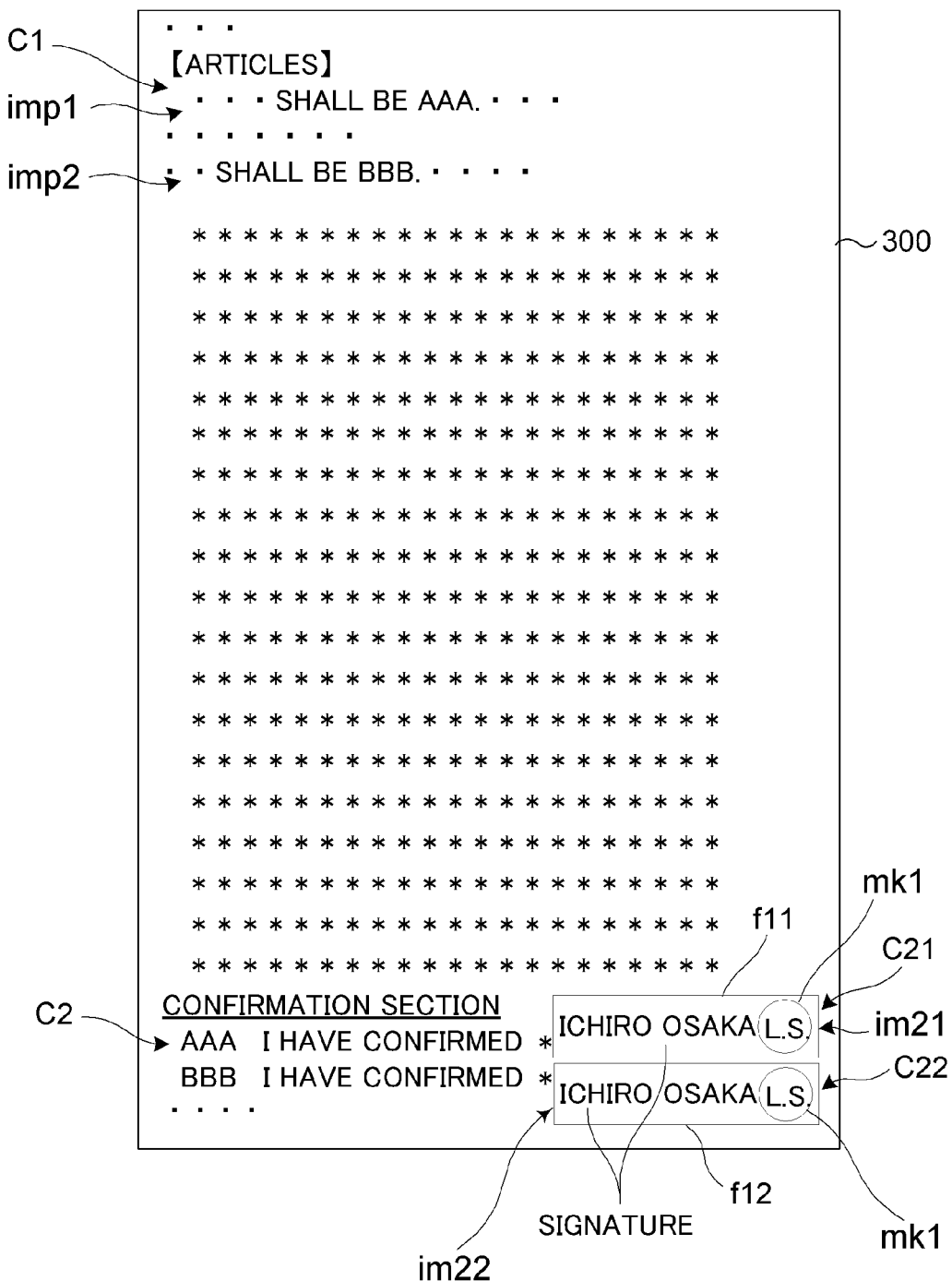
FIG. 6 is a view showing an agreement on which the sticky notes are reattached.

In this embodiment, the second position is a position in the above document image where the consistent image masks at least one of predetermined images im21, im22 (images each indicated by the dashed box in FIG. 5), i.e., the image im21 formed of an underbar, a space, and the letters "L.S." and representing the signature space C21 and the image im22 formed of an underbar, a space, and the letters "L.S." and representing the signature space C22. In this embodiment, when in S7 the document reading section 5 reads the agreement 300 on which, as shown in FIG. 6, the sticky note f11 is attached to mask the image im21 representing the signature space C21 and the sticky note f12 is attached to mask the image im22 representing the signature space C22, the second determining section 103 determines that in the read document image the image im21 representing the signature space C21 is masked by the image representing the sticky note f11 and the image im22 representing the signature space C22 is masked by the image representing the sticky note f12, and thus determines that the consistent images are located at the second position in the document image.

When like this the second determining section 105 determines that the consistent images detected in S8 are located at the second position in the document image acquired in S7 (YES in S9), the control section 100 permits the acquired document image to be formed by the image forming section 12 or saved on the HDD 92 and, depending upon whether the command to perform the signature confirmation mode entered in S6 contains an image formation command or an image saving command, causes the image forming section 12 to form the document image or causes the HDD 92 to store the document image (S10).

If in S8 the consistent image detecting section 104 determines that the document image of the agreement 300 contains no image having the aforementioned consistency with the detection target sticky note image (NO in S8) or if in S9 the second determining section 105 determines that the consistent images are not located at the second position (NO in S9), the control section 100 ends the processing without performing the formation of the document image by the image forming section 12 and the saving of the document image on the HDD 92.

In some cases, written documents of agreement, confirmation, and the like contain a signature space to be signed by a counterparty after his/her confirmation of the contents. However, a signature space is generally placed at the end of a document. Therefore, even if a signature is entered at the end of the document, it is difficult to know whether or not before the entry of the signature in the signature space, the confirmer, counterparty or the like actually confirmed all of an enormous number of articles described above the signature space. If a document of agreement or confirmation has been completed even though the articles are unconfirmed by the confirmer, counterparty or the like, this may cause troubles later on the contents of the agreement or confirmation between the party having requested for confirmation and the confirmer. Although it is conceivable to put sticky notes on the document to point clearly at important parts of the document of agreement, confirmation or the like and thus make the important parts easily recognizable and understandable, it is not possible to know whether the confirmer has signed his/her name after actually recognizing the matters described in the important parts.

In this embodiment of the present disclosure, it can be ensured by the detection in S3 that the sticky notes f11, f12 have been attached on the locations imp1, imp2 in the paper agreement 300 and it can be ensured by S8 and S9 that the sticky notes f11, f12 have been moved to and reattached on the signature spaces C21, C22 in the paper agreement 300. Therefore, in showing the counterparty the locations in the document of agreement or confirmation where matters to be confirmed are described using sticky notes attached on the document, requesting the counterparty to give a signature indicating that he/she has confirmed the matters to be confirmed, and thus preparing the signed document, the certainty of the counterparty having signed the document after confirming the matters to be confirmed can be increased.

Furthermore, because of no need to save an image representing a signature on the image forming apparatus 1 for the purpose of verifying the signature, risks including unauthorized use of the signature can be avoided.

Although the embodiment of the present disclosure has thus far been described, the present disclosure is not limited to the above embodiment and can be modified in various ways. For example, although the description of the above embodiment has been given taking a multifunction peripheral as an example of the image forming apparatus according to the present disclosure, the example is merely illustrative and the document reading device according to the present disclosure may be, for example, a scanner having no image formation function.

The structure, configuration, and processing shown in the above embodiment with reference to FIGS. 1 to 6 are merely illustrative of the present disclosure and the present disclosure is not intended to be limited to the above structure, configuration, and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A document reading device comprising:
a control section configured to cause the document reading device to operate in a document confirmation mode and a signature confirmation mode;
a document reading section configured to optically read a document image of the original document;
a sticky note image detecting section configured to detect, from the document image read by the document reading section, a sticky note image consistent with a predetermined standard sticky note image representing a sticky note and a position of the sticky note image in the document image;
a first determining section configured to determine whether or not the position of the sticky note image detected by the sticky note image detecting section is a predetermined first position in the document image;
a detection target image storage section configured to, when the first determining section determines that the position of the sticky note image is the first position, store the sticky note image as a detection target image;
a consistent image detecting section configured to detect, from a second document image acquired by a different reading of the original document by the document reading section, a consistent image having a predetermined consistency with the detection target image stored in the detection target image storage section; and
a second determining section configured to determine whether or not a position of the detected consistent image is a predetermined second position different from the first position in the document image,
wherein in the document confirmation mode, the control section is further configured to, when the first determining section determines that the position of the sticky note image detected by the sticky note image detecting section in the document image read by the document reading section is the first position, allow the detection target image storage section to store the sticky note image as the detection target image, and
in the signature confirmation mode, the control section is further configured to, when the second determining section determines that the position of the consistent image detected by the consistent image detecting section in the second document image acquired by the different reading by the document reading section in the document confirmation mode is the second position, permit formation or saving of the second document image acquired by the different reading.

2. The document reading device according to claim 1, wherein the sticky note image detecting section is configured to detect a presence or absence of the sticky note image consistent with the standard sticky note image in the document image by detecting whether or not the document image contains a predetermined mark image common between the standard sticky note image and the sticky note image.

3. The document reading device according to claim 1, wherein the first determining section is configured to determine whether or not the position of the sticky note image detected by the sticky note image detecting section is the first position by determining whether or not the sticky note image masks an image representing a predetermined character string in the document image.

4. The document reading device according to claim 1, wherein the consistent image detecting section is further configured to, when the detection target image and part of the second document image acquired by the different reading have a commonality as images representing the sticky note, determine that both the detection target image and the part of the second document image have the predetermined consistency and detect the part of the second document image as the consistent image.

5. The document reading device according to claim 1, further comprising
   a storage section configured to store a document image of the original document acquired by reading by the document reading device,
   wherein the control section is further configured to, when the second determining section determines that the position of the detection target image is the second position, allow the storage section to store the second document image acquired by the different reading.

6. An image forming apparatus comprising a document reading device and an image forming section,
   the image forming section being configured to form on a sheet a document image of an original document acquired by reading by the document reading device,
   the document reading device comprising:
      a control section configured to cause the document reading device to operate in a document confirmation mode and a signature confirmation mode;
      a document reading section configured to optically read a document image of the original document;
      a sticky note image detecting section configured to detect, from the document image read by the document reading section, a sticky note image consistent with a predetermined standard sticky note image representing a sticky note and a position of the sticky note image in the document image;
      a first determining section configured to determine whether or not the position of the sticky note image detected by the sticky note image detecting section is a predetermined first position in the document image;
      a detection target image storage section configured to, when the first determining section determines that the position of the sticky note image is the first position, store the sticky note image as a detection target image;
      a consistent image detecting section configured to detect, from a second document image acquired by a different reading of the original document by the document reading section, a consistent image having a predetermined consistency with the detection target image stored in the detection target image storage section; and
      a second determining section configured to determine whether or not a position of the detected consistent image is a predetermined second position different from the first position in the document image,
   wherein when the control section causes the document reading device to operate in the document confirmation mode, the control section is further configured to, in a case where the first determining section determines that the position of the sticky note image detected by the sticky note image detecting section in the document image read by the document reading section is the first position, allow the detection target image storage section to store the sticky note image as the detection target image, and
   when the control section causes the document reading device to operate in the signature confirmation mode, the control section is further configured to, in a case where the second determining section determines that the position of the consistent image detected by the consistent image detecting section in the second document image acquired by the different reading by the document reading section in the document confirmation mode is the second position, permit formation or saving of the second document image acquired by the different reading.

* * * * *